Oct. 10 1933.   A. B. CUNNINGHAM   1,930,192
POWER TRANSMITTING OR REGISTERING DEVICE
Filed March 30, 1929   2 Sheets-Sheet 2

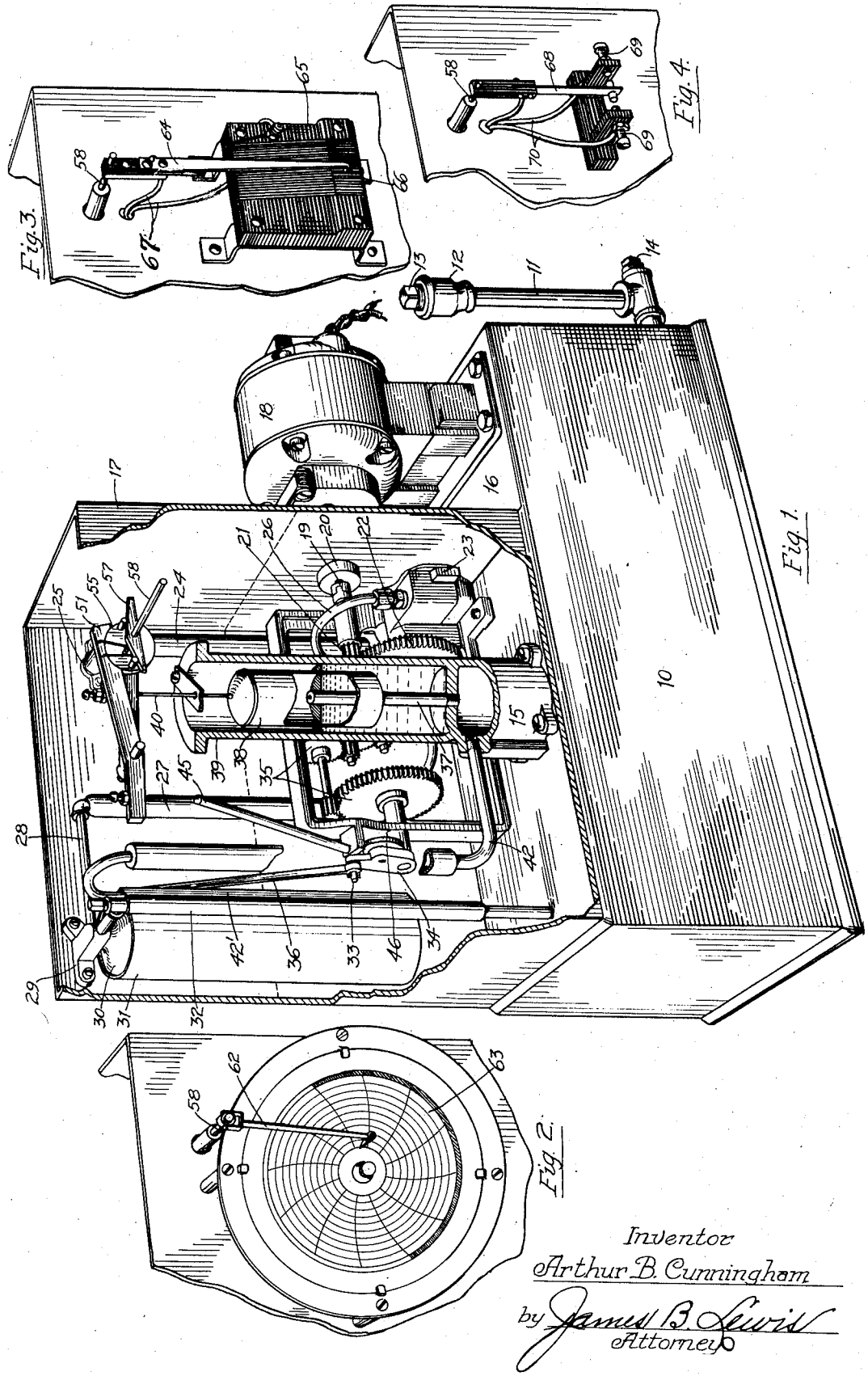

Inventor
Arthur B. Cunningham
by James B. Lewis
Attorney

UNITED STATES PATENT OFFICE 1,930,192

POWER TRANSMITTING OR REGISTERING DEVICE

Arthur B. Cunningham, Chicago, Ill., assignor to Republic Flow Meters Company, Chicago, Ill., a corporation of Illinois Application March 30, 1929. Serial No. 351,337

7 Claims. (Cl. 23—256)

This invention relates in general to a system for transmitting or measuring variations in a value such as a quantity or quality for measuring said quantity or for controlling or other desirable purposes, the variations in the value being transmitted by means of an auxiliary power, impulses or changes of which are controlled by the variation in the value to effect the measuring, controlling or other suitable device.

More particularly the invention relates to a system of the character described for measuring or transmitting the extent or magnitude of movements of a movable member which is influenced by variations in the values to be measured or transmitted. The principal object of the invention is to provide a system wherein the movable member, which is influenced by variations in the value to be measured, freely assumes a position representative of said value and remains in said position for an interval of time during which interval the member co-operates with means actuated by auxiliary power to cause the measuring, controlling or other suitable operation.

Another object of the invention is to provide an auxiliary power operated mechanism for transmitting the movement of the movable member, thus relieving the member of all work such as operating the measuring, controlling or other device thereby contributing to the sensitivity of said member.

Another object is to provide a system of this character adapted for use with measuring systems wherein the value being measured constantly varies and the extent of the variation is desired to be obtained. One type of such measuring system is a gas analyzing apparatus in which percentage of a certain gas in a gaseous mixture is ascertained by absorption of the gas being measured by passing the gaseous mixture through an absorption liquid for removing the gas being measured, the non-absorbed gases influencing a float bell movement of which is utilized to indicate the percentage of the gas absorbed.

Another object is to provide in such a system a common motor for actuating the apparatus which influences or causes the movement of said member movable in accordance with variations in the value and for actuating the auxiliary power operated means.

Further objects are to provide a system embodying a novel construction and arrangement of apparatus and to obtain other results and advantages that may be brought out by the following description.

Referring to the accompanying drawings in which the same reference characters designate corresponding and like parts:

Fig. 1 is a perspective view of a gas analyzing apparatus with certain parts broken away and other parts shown in section for clearness in illustration.

Fig. 2 shows the application of the device to a recorder.

Fig. 3 shows the application of a device to a remote indicating system.

Fig. 4 shows the application of the device to a control system.

Figure 5:
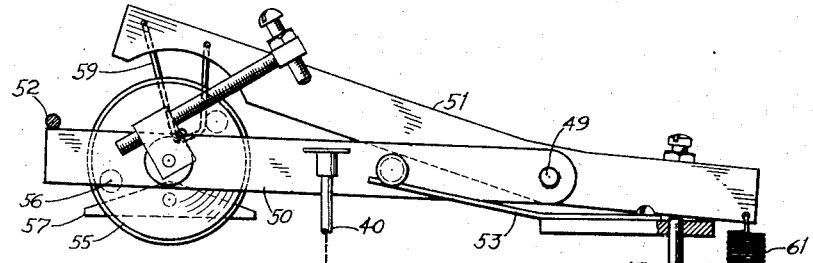
Figure 6:
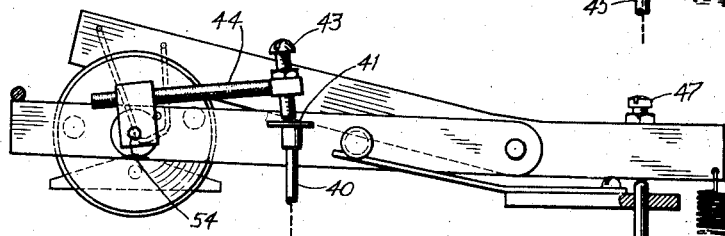
Figure 7:
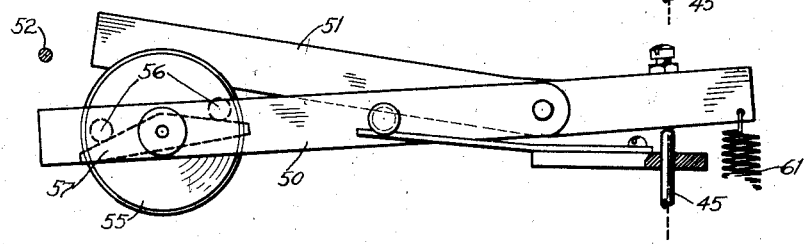

Figs. 5, 6, and 7 respectively, show the relative positions of the parts of the transmitting mechanism in different stages of operation.

Figure 8:
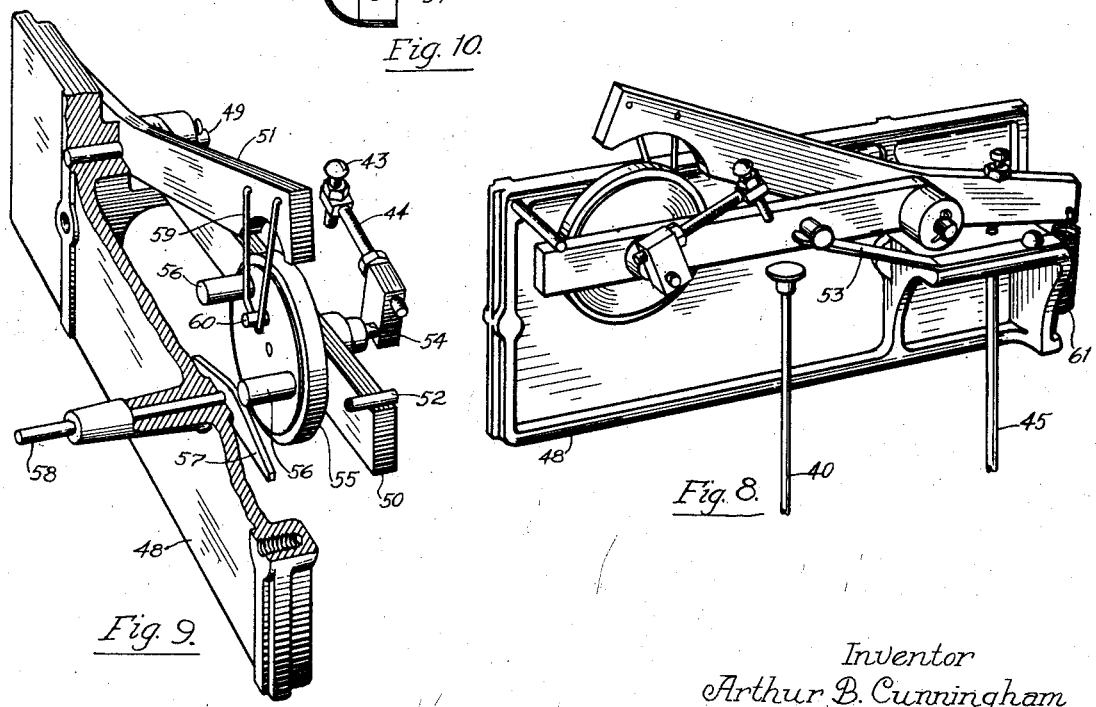

Fig. 8 shows a perspective veiw of the transmitting mechanism.

Figure 9:
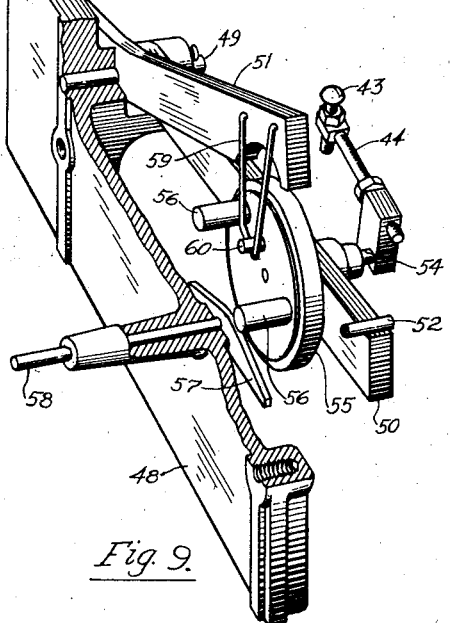

Fig. 9 shows another view of the transmitting mechanism with certain parts broken away for clearness of illustration.

Figure 10:
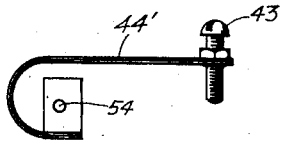

Fig. 10 shows a thermostatic tappet arm.

For the purpose of illustrating the principles of the invention I have shown the same in use in connection with a gas analyzing apparatus substantially identical in construction and operation with that shown in my co-pending application Serial No. 116,777, filed June 18, 1926, said apparatus including a tank 10 for containing a caustic potash solution through which measured charges of the flue gas are passed to absorb the carbon dioxide therefrom. The tank 10 is provided with a pipe 11 having a funnel 12 closed by a plug 13 by means of which the tank may be charged with a suitable caustic potash solution and a drain plug 14 by which the tank may be emptied of the solution. The tank is provided with an overflow pipe the inner end of which opens within a dome 15 so that the potash level is fixed at a height such that the tank is completely filled with the solution. A casing 17 is mounted on the cover plate 16 and forms a liquid tight joint therewith. The casing 17 is partially filled with a light oil to the level indicated by the dotted line on Fig. 1 of the drawings. An electric motor 18 is mounted on the cover plate 16 outside of the casing and is provided with a shaft 19 which extends into the casing thru a stuffing box 20. A pinion 21 is secured to the shaft within the casing and drives a gear 22 for operating a pump 23 adapted for pumping flue gases. The gases enter the pump through a pipe 24 which passes through the wall of the casing 17 at 25 and is connected in any suitable way with a source of gas to be analyzed. The gas is discharged from the pump 23 through pipes 26, 27 and 28 into a manifold 29 provided with a passage opening to the atmosphere through the rear wall of the casing. It is the purpose of the pump to provide a continuous stream of gas from the source to be measured through the passage in the manifold.

Measuring means for taking measured quantities from the gas passing through the manifold include a hollow piston 30 containing suitable measuring compartments and a cylinder 31 surrounding the piston and containing a sealing liquid. The measured quantities of gas are discharged from the piston through the pipe 32 which extends downwardly through the top plate into the tank 10. The cylinder 31 is periodically raised and lowered by means of a crank 33 carried on a shaft 34 driven by reduction gears 35 from the gear 22 and the cylinder is connected to the crank by a connecting rod 36 pivoted to the upper end of the cylinder. The gas after passing through the potash solution enters the dome 15 and passes upwardly through the pipe 37 into the bell 38 which is sealed in a sealing liquid contained in a standpipe 39 open at its upper end. A rod 40 extends upwardly from the bell 38 and is provided with a tappet 41 for engagement with a contact screw 43 carried by an arm 44. As the gas displaces the liquid in the bell the bell will rise and the height to which it rises will depend upon the amount of gas remaining after the carbon dioxide has been absorbed from the charge. Said rod 41 is thus an element or member positionable in accordance with a value. The height to which the bell 38 rises will be inversely proportional to the percentage of the carbon dioxide in the sample taken. After the bell has been given opportunity to reach the highest position and remain in that position for an interval of time the dome 15 is opened to atmosphere through a pipe 42 having a seal 42' controlled by movement of cylinder 31. When the pipe is opened to atmosphere the gas will be discharged from the bell 38 and the bell will return to its initial lowered position ready for a new charge. A push rod 45 is mounted in suitable guides and is arranged to engage an adjustable contact 47 carried on the end of a lever to be later described. The lower end of the push rod bears upon a cam 46 carried by the shaft 34. The movements of the piston 31, float 38 and push rod 45 are so synchronized that the bell assumes its highest position before the push rod is elevated.

The auxiliary power operated transmitting mechanism includes a base 48 adapted to be mounted at a convenient point on the gas analyzer or other device and in position so that the mechanism carried thereby will be operated by the analyzer or other apparatus. This base carries a pivot 49 upon which is mounted a member or floating beam 50 and an auxiliary power operated lever 51 and the floating beam is held in raised position against a suitable stop 52 by means such as a spring 53 or any other suitable means. Mounted upon the beam 50 is a shaft 54 which carries a friction wheel 55 and the tappet arm 44 before mentioned. The friction wheel 55 has positioning means, such as two pins 56 preferably placed at opposite sides of the axis thereof as illustrated in Fig. 9, said pins adapted when the wheel is in lowered position to co-operate with and position or actuate an element or member 57 shown as a cross-piece and carried by the shaft 58 upon which the indicating or controlling arm is mounted as shown in Figs. 2, 3 and 4. The auxiliary power operated lever 51 is biased and normally restrained away from actuated element or positionable member 57 to the definite or elevated position as illustrated in Fig. 5 by suitable means, such as a spring 61, and said lever carries a finger or loop 59 which co-operates with a pin 60 carried by the wheel, at one side of the center thereof, to rotate said wheel and to normally maintain said wheel in such position that the arm 44 is retained in elevated position as shown in Fig. 5, suitable stop means being provided to limit upward movement of the lever 51 above a predetermined point. The lever 51 is adapted to turn about the pivot 49 and when in lowered position to co-operate with the friction wheel 55 and lock, brake or hold said wheel against rotation. In order that the wheel may be more effectively gripped or held the lever, where it contacts with the wheel 55, is cut away so as to conform with the periphery of the wheel to engage the same over a greater area to prevent rotation thereof. As a further means to prevent rotation of the wheel said wheel includes a material which when engaged by the lever 51 gives a firm frictional contact with the lever and prevents rotation of said wheel.

As an example, the friction wheel may comprise a circular disk of leather securely clamped between two metallic or other rigid discs of smaller diameter, the construction being such that the leather extends beyond the supporting discs in position to be engaged by the lever when the latter is depressed. While this type of friction wheel is satisfactory from a practical standpoint it is to be understood that other types of friction wheels may be used in lieu of the type herein described.

Where the measuring device, or gas analyzing apparatus as illustrated, is subjected to varying temperatures it may be necessary, in order to secure accuracy in indications, to make corrections for such changes. One form of device for compensating for temperature changes in the ambient atmosphere is disclosed in Fig. 10 and which includes a temperature compensated tappet arm for use in lieu of tappet arm 44 illustrated in the several figures. The form of temperature compensated arm disclosed in Fig. 10 comprises a thermostatic bar 44' which may be constructed of any appropriate materials and which carries at its free end the contact screw 43 for co-operation with the tappet 41 of the float in the same manner as when carried by the arm 44.

The mode of operation is as follows:

During the down stroke of the cylinder 31 a given volume of gas to be analyzed is taken, in known manner, into the measuring compartment of piston 30 and this gas is discharged from the chamber, during the up stroke of the cylinder, through pipe 32 into the tank 10, and from said tank that part of the gas not absorbed passes into dome 15 thence through pipe 37 into the bell 38. The gas thus entering the bell elevates the same to a position depending upon the percentage of gas absorbed from the measured volume during its passage through the absorption liquid in tank 10. Elevation of the bell, by the nonabsorbed gases, raises the rod 40 and its tappet 41 in position in accordance with the value to receive the contact screw 43 carried by arm 44, when said arm descends, as illustrated in Fig. 6.

The movement of the parts are so synchronized that after the bell comes to rest in its elevated position the push rod 45, raised by cam 46, begins its upward movement thereby depressing the lever 51. Downward movement of the lever 51 lowers the loop 59 thus allowing the contact screw 43, carried by arm 44, to contact by its own weight with and rest upon the tappet 41, as illustrated in Fig. 6, this movement of the arm rotating the wheel 55 to fix the position of pins 56. Continuing on its downward movement the lever contacts with the wheel, as shown in Fig. 6, and grips the wheel in its then position against rotation. Further downward movement of the lever in integral or unitary with the wheel or rotatable element and the beam 50 and causes the beam 50 to swing around the pivot 49 and the pins 56 to contact with and align the actuated or positionable element or member 57, carried by shaft 58, with said pins as shown in Fig. 7. Thus the shaft 58 is rotated, an amount corresponding to the position of the float, to actuate an auxiliary device to perform an indicating, controlling or other suitable operation.

After the member 57 has been aligned with pins 56 the push rod 45 begins its downward movement with the resulting upward movement of the lever 51 and beam 50 due to springs 61 and 53. The beam and lever move upwardly together until the beam is arrested by stop 52, thereafter the lever continues its upward movement and after its disengagement from the wheel the loop 59 reengages the pin 60 thereby rotating wheel 55 to elevate the arm 44 to the position illustrated in Fig. 5 which is the normal position of the lever and arm. Loop 59 and pin 60 form a pin and slot connection.

After the lever 51 assumes its normal position, shown in Fig. 5, the piston 31, in its down stroke, unseals the outlet of pipe 42 thereby venting the interior of the bell to the atmosphere whereupon the bell returns to its initial lowered position ready for a new charge.

The operations just described are continuously repeated and as long as the quality of the gaseous mixture remains unchanged the float will come to rest in the same elevated position at each cycle of operation with the result that the position of member 57 remains unchanged, hence there would be no change in the indicating, recording or controlling operation.

When conditions are changed, that is to say, if in a given analysis a smaller quantity of gas is absorbed a greater quantity will be left to be introduced into the bell 38 than in the preceding analysis and the bell will come to rest at a higher elevation than in the preceding analysis. Now as the arm 44 descends it will travel a shorter distance than previously traveled before being arrested by contact screw 43 coming to rest on tappet 41 carried by the float 38. This causes a smaller angular movement of the wheel 55 and when the pins 56 contact with member 57 they realign the member to correspond to the then setting of the wheel 55. If a greater quantity of gas is absorbed than in the nearest preceding analysis a smaller quantity of gas will be left to be introduced into the bell hence the bell will come to rest at a lower position than in the preceding analysis thus the arm 44 will move through a greater distance than previously traveled in coming to rest on the tappet 41 carried by the float. This will cause the positioning pins 56 to occupy a different angular position from that occupied on the previous analysis and when they contact with member 57 they will move said member to a new position corresponding to the angular position which they then occupy. Each movement of the member 57 is transmitted through shaft 58 to the arm or finger carried by said shaft to correspondingly cause said arm to perform its indicating, recording, controlling or other suitable operation.

From the foregoing it will thus be apparent that the float is relieved of all work, being free to respond to the minutest variations in volume of the non-absorbed gases, that the work required to operate the member which performs the indicating, recording or controlling operation is performed by auxiliary power, and that the power for performing the recording, indicating, controlling or other suitable operation may be as great or as small as the conditions of the particular installation may require.

Several possible applications of the invention are illustrated in Figs. 2, 3 and 4 for purpose of illustration only.

In Fig. 2 the shaft 58 carries a pen arm and pen 62 for co-operation with a chart 63 operated by a suitable clock mechanism, not shown, to perform a recording operation. In Fig. 3 the shaft 58 carries a contact arm 64 for co-operation with a resistance element 66 carried by an insulated member 65. This resistance element being connected through suitable leads 67 with an indicating, registering, recording integrating or other auxiliary device located at a point remote from the analyzing apparatus. In Fig. 4 the shaft 58 carries a contact arm 68 adapted to co-operate with contacts 69 for performing a controlling operation, the contacts 69 being connected through suitable leads 70, with the auxiliary device to be controlled which may be a heating unit or the like.

While I have shown and described a system embodying certain construction and arrangement of apparatus and in connection with a gas analyzing apparatus it will be understood that this is only for the purpose of illustrating the principle of the invention and that many modifications and changes can be made in the details of construction and arrangement and that the invention is susceptible of use with other types of measuring systems without departing from the spirit or scope of the invention. Therefore, I do not wish to be understood as limiting myself to the embodiment of the invention or the application thereof illustrated in the drawings.

Having thus described the invention, what I claim is:—

1. The combination with a member positionable in accordance with a value and means operable to position said member, of an actuated element, a floating beam, means normally restraining said beam away from said element, a shaft, a pair of pins carried by said shaft and adapted to position said element when the beam is oscillated, a thermostatic tappet arm carried by said shaft for co-operation with said member to position said pins, means for locking said pins in position when the beam is oscillated, and power means for operating said beam.

2. The combination with a tappet and means operable to position the tappet in accordance with a value, of a shaft carrying a cross-piece, a pivotally supported beam, means normally restraining said beam to a definite position, a rotary wheel and tappet arm carried by said beam, a plurality of pins carried by the wheel adapted, when the beam is oscillated, to co-operate with and position the cross-piece in alignment therewith, said arm adapted to co-operate with said tappet to position said pins, an oscillatable lever adapted to lock the wheel in position and then to oscillate said beam to bring the pins into co-operation with the cross-piece to rotate the shaft to perform a desirable function.

3. The combination with a tappet and means operable to position the tappet in accordance with a value, of a floating beam, means normally restraining said beam to a certain position, a shaft carried by said beam, a friction wheel provided with a plurality of pins and carried by said shaft, a tappet arm carried by said shaft adapted to co-operate with said tappet, when lowered, to position the wheel, a lever oscillatable toward and from said beam, means normally biasing said lever away from said beam, a finger carried by said lever and engageable with a pin carried by said wheel for raising said tappet arm, a positionable member engageable by the pins on said wheel and positioned thereby, means for oscillating said lever toward said beam to first cause the tappet arm to lower to contact with and be positioned by said tappet, then to cause said lever to contact with and hold said wheel against rotation and to swing said beam to bring the pins into co-operative relationship with said member to position same, then secondly to oscillate said lever away from said beam to restore said beam and tappet to normal position.

4. In a translating device, a base provided with a pivot and a stop, a beam supported at one end upon said pivot, means to bias said beam against said stop, a rotatable member provided with a plurality of pins and carried by said beam, a lever supported upon said pivot, means to bias said lever, away from said beam, a finger carried by said lever for co-operating with one of said pins to rotate said member in one direction as the lever moves away from said beam, and power means for oscillating said lever whereby said lever in moving towards said beam permits the member to rotate, then contacts with said member thus preventing further rotation of said member, then swings the beam around the pivot and as said lever swings away from said beam, after the beam is arrested by the stop, disengages the said member and brings the finger into contact with the last mentioned pin to rotate the said member.

5. In combination, measuring apparatus having a tappet positioned through measuring operations and a push member, a rotatable element having an arm engageable with the tappet to control the extent of rotation of the rotatable element, a beam carrying said rotatable element, a lever with which the push member coacts having a braking portion normally disengaged from said rotatable element, said lever having means coacting with a part of the rotatable element to normally hold said rotatable element inactive, mechanism to automatically and periodically motivate said push member to contact with and pivotally move said lever after each measuring operation, thereby releasing said rotatable element from its normally inactive position and contacting the braking portion of said lever with said rotatable element, said push member continuing movement thereupon to move as an integral unit the said lever while contacting with said rotatable element as a brake and the beam upon which said rotatable element is mounted, and a shaft to actuate an auxiliary device, the movement of said integral unit continuing until means on the said rotatable element coact with means on the said shaft to rotate the said shaft to an extent determined by the aforesaid arm and tappet.

6. In combination, measuring apparatus having a tappet positioned through measuring operations, a rotatable element, means movable with said rotatable element and engageable with the tappet to determine the angle of rotation of said rotatable element, a shaft, means normally holding said rotatable element inactive and movable toward the rotatable element (first) to release the rotatable element so that it may rotate until the first mentioned means engages the tappet, (second) to engage the rotatable element as a brake and (third) to bodily move with the rotatable element as an integral unit relatively to said shaft, and means to operate said shaft through said integral unitary movement to an extent determined by the angle of rotation at which the rotatable element is held by the second mentioned means.

7. In combination, measuring apparatus having a tappet positioned through measuring operations and a push member, a rotatable element having an arm engageable with the tappet to control the extent of rotation of the rotatable element, a beam carrying said rotatable element, a lever with which the push member coacts having a braking portion normally disengaged from said rotatable element, a pin and slot connection between the lever and rotatable element to normally hold said rotatable element inactive, mechanism to automatically and periodically motivate said push member to contact with and pivotally move said lever after each measuring operation, thereby releasing said rotatable element from its normally inactive position and permitting its arm to contact said tappet and contacting the braking portion of said lever with said rotatable element, said push member continuing movement thereupon to move as an integral unit the said lever while contacting with said rotatable element as a brake and the beam upon which said rotatable element is mounted, a shaft to actuate an auxiliary device, said rotatable element and shaft having mutually engageable surfaces on opposite sides of their respective axes permitting continuation of the movement of the integral unit to rotate said shaft to an extent determined by the aforesaid arm and tappet.

ARTHUR B. CUNNINGHAM.